(12) United States Patent
Mullin

(10) Patent No.: US 12,324,414 B1
(45) Date of Patent: Jun. 10, 2025

(54) BREATHING SUPPORT PET TOY AND METHOD OF USE

(71) Applicant: Make Ideas, LLC, La Jolla, CA (US)

(72) Inventor: Keith Mullin, La Jolla, CA (US)

(73) Assignee: Make Ideas, LLC, La Jolla, CA (US)

( * ) Notice: Subject to any disclaimer, the term of this patent is extended or adjusted under 35 U.S.C. 154(b) by 182 days.

(21) Appl. No.: 17/720,267

(22) Filed: Apr. 13, 2022

Related U.S. Application Data

(60) Provisional application No. 63/327,820, filed on Apr. 6, 2022, provisional application No. 63/174,204, filed on Apr. 13, 2021.

(51) Int. Cl.
*A01K 15/02* (2006.01)

(52) U.S. Cl.
CPC .................... *A01K 15/025* (2013.01)

(58) Field of Classification Search
CPC ............................ A01K 15/025; A01K 15/026
See application file for complete search history.

(56) References Cited

U.S. PATENT DOCUMENTS

| | | |
|---|---|---|
| 1,006,182 A | 10/1911 | Cousin |
| 1,022,112 A | 4/1912 | Smith |
| 1,031,095 A | 7/1912 | Smith |
| 1,534,964 A | 4/1925 | Kahnweiler |
| 2,086,631 A | 7/1937 | Munro |
| 3,445,917 A | 5/1969 | Adler |
| 3,830,202 A | 8/1974 | Garrison |
| 4,802,444 A | 2/1989 | Markham et al. |
| 4,907,537 A | 3/1990 | Shirk |
| RE34,352 E | 8/1993 | Markham |
| 5,367,986 A | 11/1994 | O'Rourke et al. |
| 5,553,570 A | 9/1996 | VanNatter, III et al. |
| 5,595,142 A | 1/1997 | Chill |
| 5,647,302 A | 7/1997 | Shipp |
| 5,792,470 A | 8/1998 | Baumgardner, Sr. |
| 5,799,616 A | 9/1998 | McClung, III |
| 5,819,690 A | 10/1998 | Brown |
| 5,832,877 A | 11/1998 | Markham |
| 5,853,757 A | 12/1998 | Durand et al. |

(Continued)

FOREIGN PATENT DOCUMENTS

GB    2253329 A    9/1992

*Primary Examiner* — Joshua J Michener
*Assistant Examiner* — Henry Hooper Mudd
(74) *Attorney, Agent, or Firm* — Tillman, Wright & Wolgin; James D. Wright; David R. Higgins

(57) ABSTRACT

A semi-hollow ball for pet play includes a thick outer shell and a hollow interior. A plurality of passages through the shell include interspersed intake passages and exhaust passages, each extending a distance through the shell. The intake passages have a wide entrance on the exterior side tapering to a substantially narrower exit on the interior side, and the exhaust passages have a wide entrance on the interior side of the shell tapering to a substantially narrower exit on the exterior side. The interior is in fluid communication with the intake passage exits and the exhaust passage entrances. The intake passages facilitate air being drawn into the ball during breath intake and air being forced into the ball during breath expelling, while the exhaust passages facilitate air being expelled from the ball during breath expelling, and air being drawn out of the ball and into the mouth during breath intake.

14 Claims, 15 Drawing Sheets

(56) References Cited

U.S. PATENT DOCUMENTS

| | | |
|---|---|---|
| 5,865,146 A | 2/1999 | Markham |
| 5,895,662 A | 4/1999 | Meyer |
| 5,965,182 A | 10/1999 | Lindgren |
| 6,050,224 A | 4/2000 | Owens |
| 6,098,571 A | 8/2000 | Axelrod et al. |
| D431,886 S | 10/2000 | Owens |
| D432,741 S | 10/2000 | Owens |
| 6,148,771 A | 11/2000 | Costello |
| 6,186,096 B1 | 2/2001 | Miller |
| 6,217,408 B1 | 4/2001 | Willinger |
| 6,237,538 B1 | 5/2001 | Tsengas |
| 6,405,681 B1 | 6/2002 | Ward |
| 6,415,741 B2 | 7/2002 | Suchowski et al. |
| 6,427,634 B1 | 8/2002 | Mann |
| 6,439,166 B1 | 8/2002 | Markham |
| 6,484,671 B2 | 11/2002 | Herrenbruck |
| 6,526,912 B1 | 3/2003 | Ottoson |
| 6,578,527 B1 | 6/2003 | Mathers |
| 6,601,539 B1 | 8/2003 | Snook |
| 6,609,944 B1 | 8/2003 | Viola |
| 6,622,659 B2 | 9/2003 | Willinger |
| 6,623,328 B1 | 9/2003 | Theel |
| 6,634,318 B1 | 10/2003 | Rucker |
| 6,651,590 B2 | 11/2003 | Willinger et al. |
| 6,681,721 B1 | 1/2004 | Buschy |
| 6,688,258 B1 | 2/2004 | Kolesar |
| 6,840,197 B1 | 1/2005 | Trompke |
| D505,233 S | 5/2005 | Viola |
| 6,899,059 B1 | 5/2005 | Crane et al. |
| D511,029 S | 10/2005 | Willinger |
| D513,816 S | 1/2006 | Crane et al. |
| 6,990,762 B1 | 1/2006 | Muday et al. |
| 7,144,293 B2 | 12/2006 | Mann et al. |
| D540,496 S | 4/2007 | Axelrod |
| 7,367,283 B2 | 5/2008 | Aboujaoude et al. |
| 7,389,748 B2 | 6/2008 | Shatoff et al. |
| 7,426,903 B2 | 9/2008 | Simon |
| 7,506,614 B1 | 3/2009 | Tsengas |
| 7,600,488 B2 | 10/2009 | Mann |
| 7,644,684 B2 | 1/2010 | Ritchey |
| 7,762,214 B2 | 7/2010 | Ritchey |
| D626,706 S | 11/2010 | Ragonetti |
| 7,823,542 B2 | 11/2010 | Freeman |
| 7,870,839 B2 | 1/2011 | Sacra |
| 8,225,747 B2 | 7/2012 | Markham et al. |
| 8,231,920 B2 | 7/2012 | Axelrod et al. |
| 8,240,273 B2 | 8/2012 | Benson |
| 8,413,612 B2 | 4/2013 | Smith |
| 8,479,687 B2 | 7/2013 | Anderson et al. |
| D688,012 S | 8/2013 | Canello et al. |
| 8,522,725 B1 | 9/2013 | Moore |
| 8,640,647 B2 | 2/2014 | Dotterer |
| D710,554 S | 8/2014 | Byrne |
| 8,875,662 B2 | 11/2014 | Angle et al. |
| 8,904,966 B2 | 12/2014 | Kolozsvari et al. |
| D721,210 S | 1/2015 | Diskin |
| 8,935,992 B2 | 1/2015 | Axelrod et al. |
| 9,027,512 B2 | 5/2015 | Prange et al. |
| 9,107,390 B1 | 8/2015 | Day |
| 9,498,433 B1 | 11/2016 | Mullin et al. |
| 9,844,703 B1 | 12/2017 | Gupta et al. |
| D817,562 S | 5/2018 | Markham |
| D822,295 S | 7/2018 | Woods et al. |
| 10,285,380 B1 | 5/2019 | Mullin |
| 11,503,806 B1 | 11/2022 | Mullin |
| 11,612,139 B2 | 3/2023 | Mullin |
| 2002/0139708 A1 | 10/2002 | Lien |
| 2003/0079693 A1 | 5/2003 | Jager |
| 2004/0244719 A1 | 12/2004 | Jager |
| 2005/0115517 A1 | 6/2005 | Wolfe, Jr. et al. |
| 2006/0260560 A1 | 11/2006 | Renforth et al. |
| 2007/0015100 A1 | 1/2007 | Morris |
| 2009/0078214 A1 | 3/2009 | Mann |
| 2010/0180832 A1 | 7/2010 | Krauss |
| 2010/0224138 A1 | 9/2010 | Axelrod et al. |
| 2011/0256208 A1 | 10/2011 | Ling |
| 2012/0111284 A1 | 5/2012 | Berger |
| 2012/0279459 A1 | 11/2012 | Angle et al. |
| 2013/0036988 A1 | 2/2013 | Lai |
| 2013/0047932 A1 | 2/2013 | Salmon Hyder et al. |
| 2013/0092097 A1 | 4/2013 | Cooper |
| 2013/0142936 A1 | 6/2013 | Stern et al. |
| 2014/0345532 A1 | 11/2014 | Valle |
| 2015/0164047 A1 | 6/2015 | Watts et al. |
| 2015/0230429 A1* | 8/2015 | Mak ................ A01K 11/00 |
| 2015/0237829 A1 | 8/2015 | Tsengas |
| 2015/0237830 A1 | 8/2015 | Sternal et al. |
| 2015/0373950 A1 | 12/2015 | Spring |
| 2016/0037751 A1 | 2/2016 | Byrne |
| 2016/0113243 A1 | 4/2016 | Mullin et al. |
| 2016/0242391 A1 | 8/2016 | Stone et al. |
| 2016/0273738 A1 | 9/2016 | Wolfinbarger |
| 2018/0000048 A1 | 1/2018 | Stone et al. |
| 2018/0098524 A1 | 4/2018 | Zhang |
| 2019/0124888 A1* | 5/2019 | Coyle ................ A01K 15/02 |
| 2022/0201978 A1 | 6/2022 | Markham |
| 2022/0217945 A1 | 7/2022 | Zoe |
| 2022/0287274 A1 | 9/2022 | Markham |

* cited by examiner

1200

1300

1400

BREATHING SUPPORT PET TOY AND METHOD OF USE

CROSS-REFERENCE TO RELATED APPLICATION

The present application is a U.S. nonprovisional patent application of, and claims priority under 35 U.S.C. § 119 (e) to, U.S. provisional patent application Ser. No. 63/174,204 filed Apr. 13, 2021, which provisional patent application is incorporated by reference herein, and claims priority under 35 U.S.C. § 119 (e) to, U.S. provisional patent application Ser. No. 63/327,820 filed Apr. 6, 2022, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to toys for pet play, and, more particularly, to a perforated pet toy which is designed to allow for increased airflow and easier breathing for a pet, such as a dog, when the pet holds the toy in its mouth.

Background

Normal breathing for a dog is through its nose. When hunting or exercising, a dog will change to circular breathing, where the dog breathes using both its nose and mouth. Blockage in the mouth, such as when a dog carries a typical ball, reduces the dog's breathing airway passage, thus making it more difficult for the dog to breathe, such as during ball fetch play and exercise. Tennis ball dangers tend to be most common in larger breeds like German Shepherds, Golden Retrievers and Labrador Retrievers, for such breeds are more likely to enjoy catching and playing intently with balls or other pet toys, and their mouths are large enough to entirely wrap around a tennis ball or other pet toy. Once a tennis ball or the like gets stuck in a dog's throat, it blocks off the dog's breathing. In fact, if not taken care of quickly, the dog may not survive. Thus, a need exists for a toy which allows for a dog to breathe freely while carrying the toy during play.

SUMMARY OF THE PRESENT INVENTION

Broadly defined, the present invention according to one aspect relates to a semi-hollow ball for pet play, including: a thick outer shell having an exterior side and an interior side and a plurality of passages therethrough, the plurality of passages including: (i) a plurality of intake passages, each intake passage extending a distance through the thick outer shell and having a wide entrance on the exterior side of the shell tapering to a substantially narrower exit on the interior side of the shell, and (ii) a plurality of exhaust passages, each exhaust passage extending a distance through the thick outer shell and having a wide entrance on the interior side of the shell tapering to a substantially narrower exit on the exterior side of the shell; and a hollow interior that is in fluid communication with both (i) the exits of the intake passages and (ii) the entrances to the exhaust passages; wherein the intake passages and the exhaust passages are interspersed with each other around the exterior side of the thick outer shell; wherein the wide entrances of the intake passages facilitate (i) air being drawn into the hollow interior of the ball during an intake of breath when the ball is carried in the mouth of a pet, and (ii) air being forced into the hollow interior of the ball during the expelling of breath when the ball is carried in the mouth of the pet; wherein the wide entrances of the exhaust passages facilitate (i) air being expelled from the hollow interior of the ball during the expelling of breath when the ball is carried in the mouth of the pet, and (ii) air being drawn out of the hollow interior of the ball and into the pet's mouth during an intake of breath when the ball is carried in the mouth of the pet; and wherein, because the intake passages and exhaust passages are interspersed with each other around the exterior side of the thick outer shell, one or more intake passages and one or more exhaust passages are available for the pet to use during both intake and expelling of breath when the ball is carried in the mouth of the pet.

In a feature of this aspect, the intake passages are distributed throughout the thick outer shell of the ball.

In another feature of this aspect, each intake passage tapers smoothly from the entrance thereof to the exit thereof, and wherein each exhaust passage tapers smoothly from the entrance thereof to the exit thereof.

In another feature of this aspect, each intake passage tapers uniformly from the entrance thereof to the exit thereof, and wherein each exhaust passage tapers uniformly from the entrance thereof to the exit thereof.

In another feature of this aspect, the entrance and exit of each intake passage have similar shapes, but wherein the shape of the entrance is proportionally larger than the shape of the exit.

In another feature of this aspect, every entrance of every intake passage has a similar shape. In further features, every exit of every exhaust passage has a similar shape; the shape of the exhaust passage exits is similar to the shape of the intake passage entrances, but wherein the shape of the intake passage entrances is proportionally larger than the shape of the exhaust passage exits; the shape of the exhaust passage exits and the intake passage entrances is a circle; the shape of the exhaust passage exits and the intake passage entrances is an oval; the shape of the exhaust passage exits and the intake passage entrances is an elongated slot; the shape of the exhaust passage exits and the intake passage entrances is a polygon; the shape of the exhaust passage exits and the intake passage entrances is a triangle; the shape of the exhaust passage exits and the intake passage entrances is a square; the shape of the exhaust passage exits and the intake passage entrances is a pentagon; and/or the shape of the exhaust passage exits and the intake passage entrances is amorphous or arbitrary.

In another feature of this aspect, the semi-hollow ball further includes one or more filters arranged in the hollow interior of the ball and covering the exits of the intake passages, the entrances to the exhaust passages, or both. In further features, the one or more filters cover all of the exits of the intake passages and all of the entrances to the exhaust passages; the one or more filters are part of an interior shell disposed in the hollow interior of the ball; the interior shell is in direct contact with the outer shell; a gap is provided between the interior shell and the outer shell; the one or more filters protrude outward into the intake passages and the exhaust passages; a sound emission device is disposed within the hollow interior of the ball; the one or more filters are part of an interior shell disposed in the hollow interior of the ball, and wherein the sound emission device is disposed within the interior shell; the sound emission device includes a bellows and a squeaker; and/or the bellows is connected to the interior shell by supports.

In another feature of this aspect, the ball is shaped like a sphere.

In another feature of this aspect, the ball is shaped like an American football.

In another feature of this aspect, the ball is shaped like a tube.

In another feature of this aspect, the ball has an amorphous or arbitrary shape.

Broadly defined, the present invention according to one aspect relates to a perforated ball for pet play, including: a solid body having an exterior and a plurality of air passages therethrough, each air passage having a wide entrance at the exterior of the solid body, a tapered section, and a narrower exit at the exterior of the solid body; wherein, as the ball is carried in the mouth of a pet, (i) the wide entrances of a first set of the air passages facilitate air being drawn through the first set wide entrances, through the first air passages, and then out of the first air passages via their respective exits and into the mouth of the pet during an intake of breath, and (ii) the wide entrances of a second set of the air passages, the second set being separate from the first set, facilitate air being expelled from the mouth of the pet through the second set wide entrances, through the second air passages, and then out of the second air passages via their respective exits during the expelling of breath.

Broadly defined, the present invention according to one aspect relates to a method of using perforated ball for pet play, the ball including a thick outer shell having an exterior side and an interior side and a plurality of passages therethrough, the plurality of passages including a plurality of intake passages, each intake passage extending a distance through the thick outer shell and having a wide entrance on the exterior side of the shell tapering to a substantially narrower exit on the interior side of the shell, and a plurality of exhaust passages, each exhaust passage extending a distance through the thick outer shell and having a wide entrance on the interior side of the shell tapering to a substantially narrower exit on the exterior side of the shell, and the ball further including a hollow interior that is in fluid communication with both the exits of the intake passages and the entrances to the exhaust passages, wherein the intake passages and the exhaust passages are interspersed with each other around the exterior side of the thick outer shell, the method including: via the wide entrances of the intake passages, drawing air into the hollow interior of the ball during an intake of breath when the ball is carried in the mouth of a pet; via the wide entrances of the exhaust passages, drawing air out of the hollow interior of the ball and into the pet's mouth during an intake of breath when the ball is carried in the mouth of the pet; via the wide entrances of the intake passages, forcing air into the hollow interior of the ball during the expelling of breath when the ball is carried in the mouth of the pet; and via the wide entrances of the exhaust passages, expelling air from the hollow interior of the ball during the expelling of breath when the ball is carried in the mouth of the pet; wherein, because the intake passages and exhaust passages are interspersed with each other around the exterior side of the thick outer shell, one or more intake passages and one or more exhaust passages are available for the pet to use during both intake and expelling of breath when the ball is carried in the mouth of the pet.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
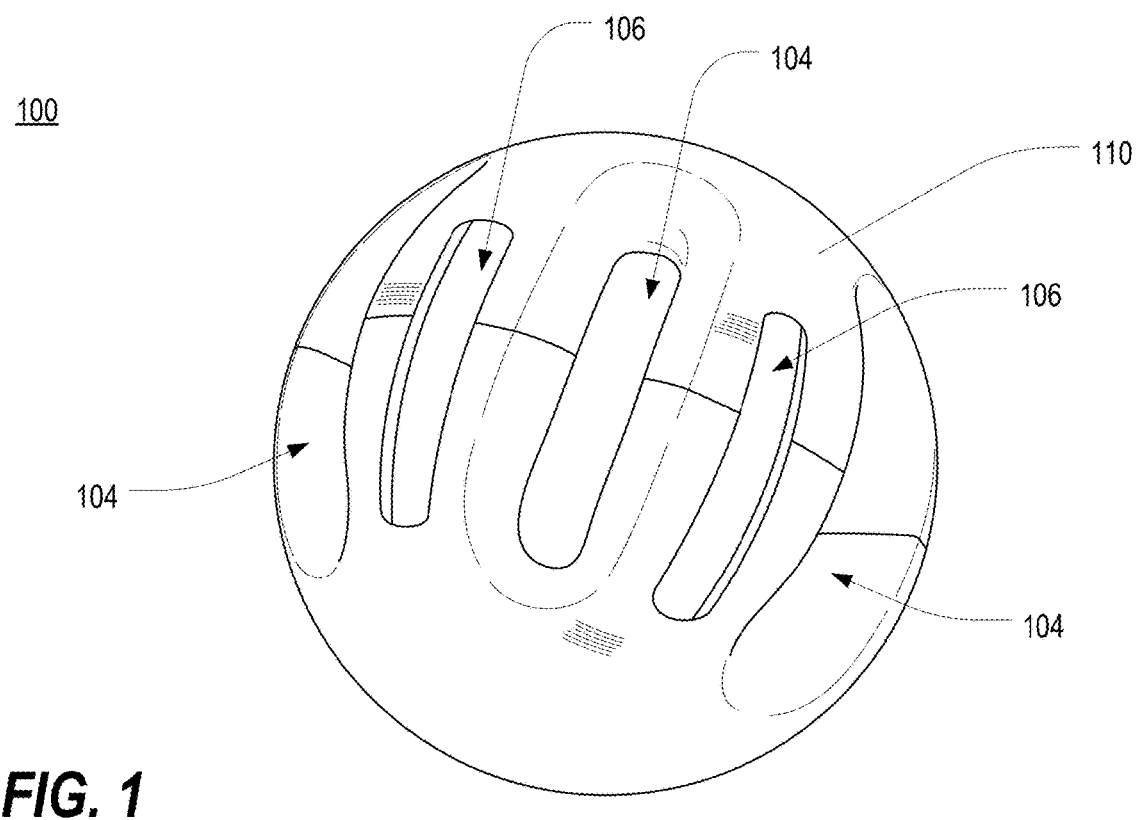
FIG. 1 is an isometric view of a spherical breathing support pet toy with elongated aerodynamic passages in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term-differs in any way from any particular dictionary definition of such term, it is intended that the meaning of the term as understood by the Ordinary Artisan should prevail.

Regarding applicability of 35 U.S.C. § 112, 16, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

Figure 2:
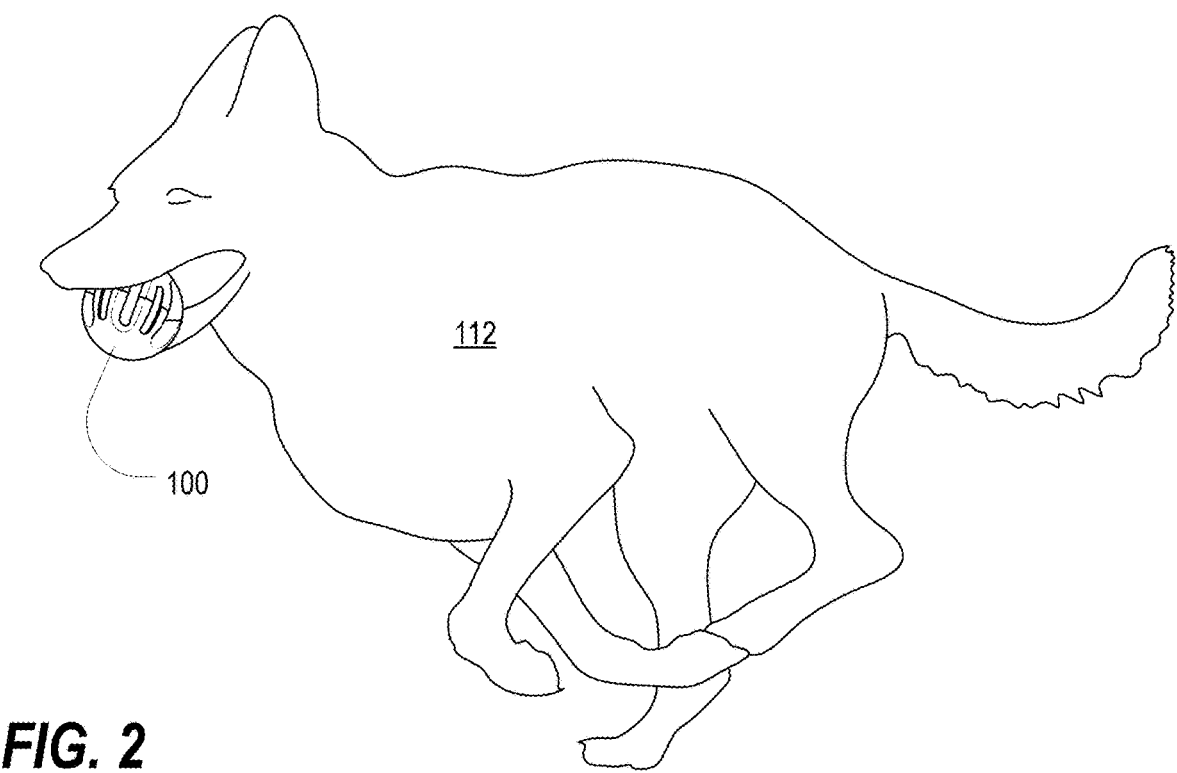
FIG. 2 is an illustration of a pet holding the breathing support pet toy of FIG. 1 while running.

FIG. 1 is an isometric view of a spherical breathing support pet toy 100 with elongated aerodynamic passages 104,106 in accordance with one or more preferred embodiments of the present invention, and FIG. 2 is an illustration of a pet 112 holding the breathing support pet toy 100 of FIG. 1 while running. The pet toy 100 includes a perforated exterior shell 110, a plurality of air flow intake passages 104, and a plurality of air flow exhaust passages 106. In the toy 100 of FIG. 1, the exterior shell 110 is generally spherical in shape, but it will be appreciated that shells of a variety of different shapes, some of which are illustrated herein, may be substituted therefor. In the toy 100 of FIG. 1, the air flow passages 104,106 are elongated slots in cross-section, but it will be appreciated that passages of a variety of different cross-sections, some of which are illustrated herein, may be substituted therefor. The air flow passages 104,106, which are interspersed with one another around the shell 110, allow easier breathing while the toy 100 is held in the mouth of a pet 112. The passages 104,106 increase the air flow in and out of the pet's 112 mouth and may prevent choking on the pet toy 100 if were to get lodged in the pet's throat.

Figure 3:
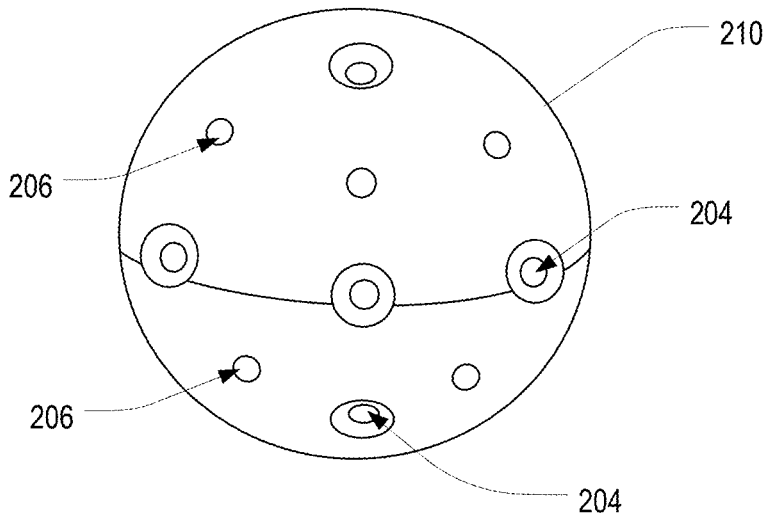
FIG. 3 is a front view of another breathing support pet toy with aerodynamic passages in accordance with one or more preferred embodiments of the present invention.

FIG. 3 is a front view of another breathing support pet toy 200 with aerodynamic passages 204,206 in accordance with one or more preferred embodiments of the present invention. The pet toy 200 includes a spherical perforated exterior shell 210, a plurality of air flow intake passages 204, and a plurality of air flow exhaust passages 206. The air flow passages 204,206, which are interspersed with one another around the shell 210, are generally circular in shape.

Figure 4:
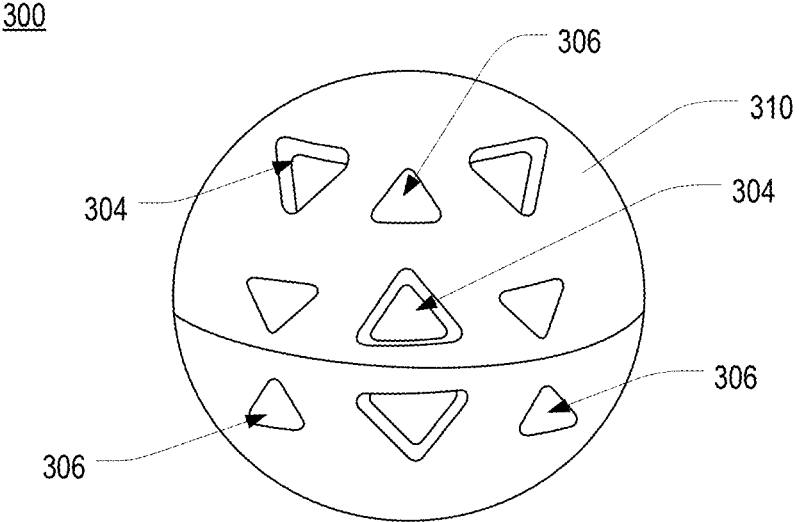
FIG. 4 is a front view of another breathing support pet toy with aerodynamic passages in accordance with one or more preferred embodiments of the present invention.

FIG. 4 is a front view of another breathing support pet toy 300 with aerodynamic passages 304,306 in accordance with one or more preferred embodiments of the present invention. The pet toy 300 includes a spherical perforated exterior shell 310, a plurality of air flow intake passages 304, and a plurality of air flow exhaust passages 306. The air flow passages 304,306, which are interspersed with one another around the shell 310, are generally triangular in shape.

Figure 5:
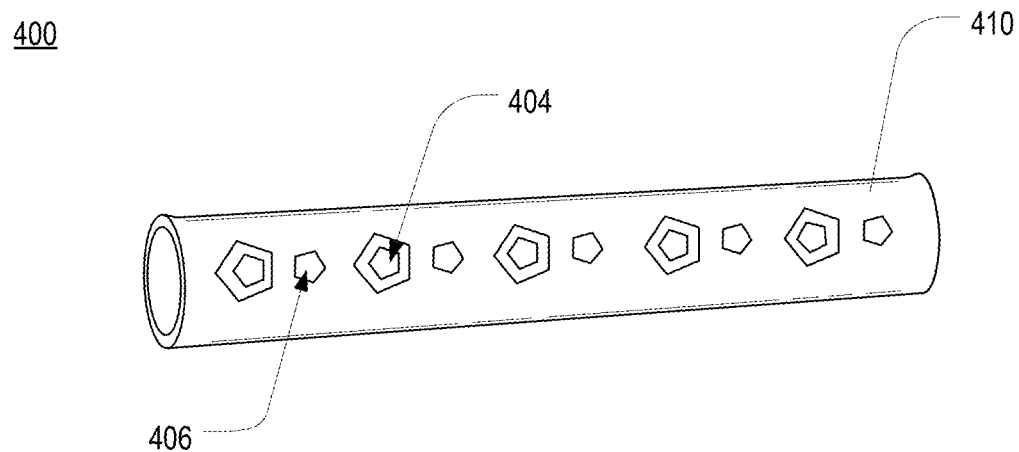
FIG. 5 is a front view of another breathing support pet toy with aerodynamic passages in accordance with one or more preferred embodiments of the present invention.

FIG. 5 is a front view of another breathing support pet toy 400 with aerodynamic passages 404,406 in accordance with one or more preferred embodiments of the present invention. The pet toy 400 includes a tubular perforated exterior shell 410, air flow intake passages 404, and air flow exhaust passages 406. The air flow passages 404,406, which are interspersed with one another around the shell 410, are generally pentagonal in shape.

Figure 6:
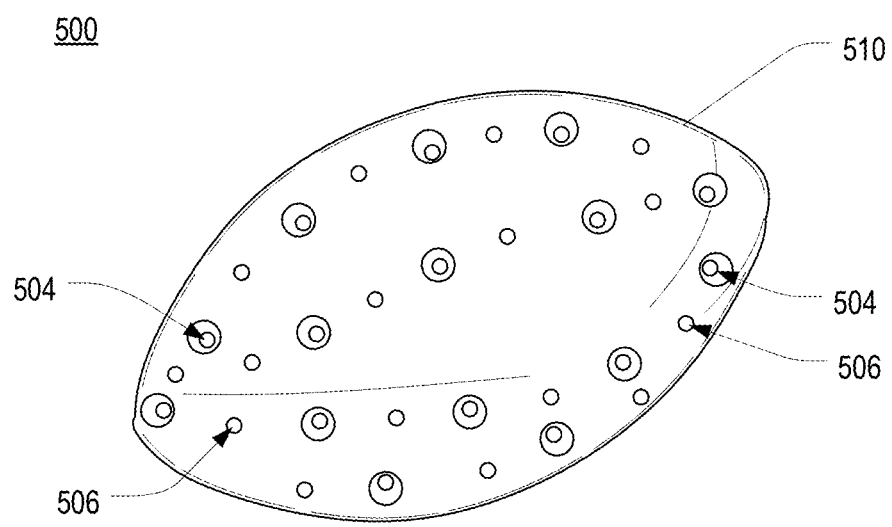
FIG. 6 is a front view of another breathing support pet toy with aerodynamic passages in accordance with one or more preferred embodiments of the present invention.

FIG. 6 is a front view of another breathing support pet toy 500 with aerodynamic passages 504,506 in accordance with one or more preferred embodiments of the present invention. The pet toy 500 includes a perforated exterior shell 510, air flow intake passages 504, and air flow exhaust passages 506. The exterior shell 510 approximates the shape of an American football. The air flow passages 504,506, which are interspersed with one another around the shell 510, are generally circular in cross-section.

In the breathing support pet toys 100,200,300,400,500 of FIGS. 1-6, the pet toy's air flow intake passages 104,204, 304,404,504, are air passages of various shapes which are aerodynamically designed to increase or support air flow into the breathing support pet toy 100,200,300,400,500 in and out the mouth of pet 112 when it is holding the toy 100,200,300,400,500 in its mouth. One or more methods of use are provided in accordance with one or more preferred embodiments of the present invention, wherein, during inhalation, air flow from the environment into the toy 100,200,300,400,500 is enhanced by the intake passages 104,204,304,404,504, while during exhalation, air flow from the dog's lungs and mouth into the toy 100,200,300,400,500 is enhanced by the intake passages 104,204,304,404,504. Similarly, the pet toy's air flow exhaust passages 106,206, 306,406,506, are air passages of various shapes which are aerodynamically designed to increase or support air flow out of the breathing support pet toy 100,200,300,400,500 in and out of the mouth of pet 112 when it is holding the toy 100,200,300,400,500 in its mouth. One or more methods of use are provided in accordance with one or more preferred embodiments of the present invention, wherein, during inhalation, air flow from the interior of the toy 100,200,300, 400,500 to the pet's mouth and lungs is enhanced by the exhaust passages 106,206,306,406,506, while during exhalation, air flow from the interior of the toy 100,200,300,400, 500 to the environment is enhanced by the exhaust passages 106,206,306,406,506. The air flow intake and exhaust passages may be of any aerodynamic shape or geometry shape known by an Ordinary Artisan or in the industry or art, that may be used for the purposes and system as described herein.

Figure 7:
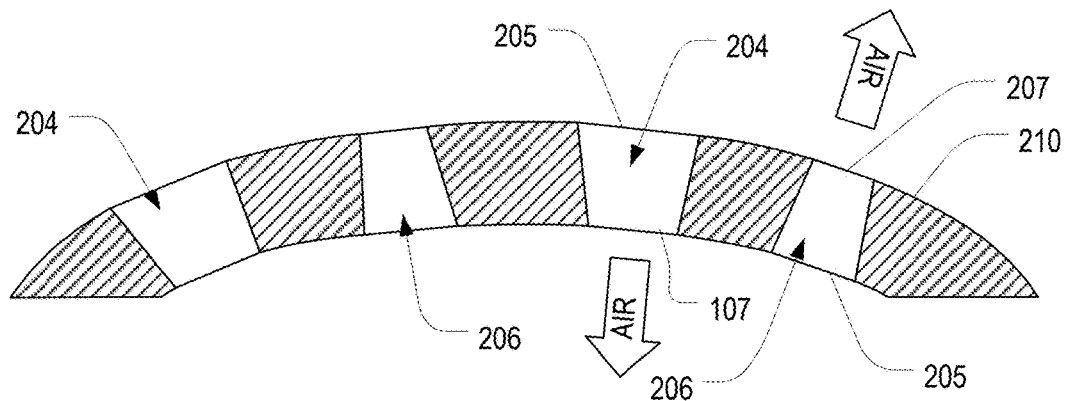
FIG. 7 is a fragmentary cross-sectional view of the exterior shell of the breathing support pet toy of FIG. 3.

FIG. 7 is a fragmentary cross-sectional view of the exterior shell of the breathing support pet toy of FIG. 3. Each passage 204,206 is conical in shape, and the entrance 205 is substantially wider than the exit 207. Each passage 204,206 tapers from the entrance 205 to the exit 207, which is substantially narrower than the entrance. These conical shaped air flow passages 204,206 create air flow which is directed, channeled or compressed. During inhalation, this shape facilitates air flow from the environment into the toy 200 is enhanced by the intake passages 204, while during exhalation, air flow from the dog's lungs and mouth into the toy 200 is enhanced by the intake passages 204. During inhalation, this shape facilitates air flow from the interior of the toy 200 to the pet's mouth and lungs is enhanced by the exhaust passages 206, while during exhalation, air flow from the interior of the toy 200 to the environment is enhanced by the exhaust passages 206.

Figure 8:
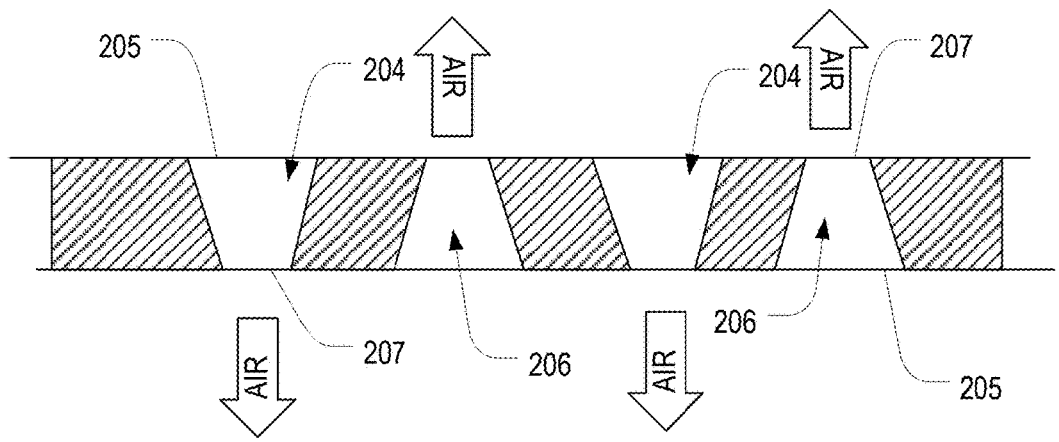
FIG. 8 is a fragmentary cross-sectional view of a flat exterior shell of another breathing support pet toy in accordance with one or more preferred embodiments of the present invention.

The curved outer shell 210 of FIG. 7 may serve to position or orient the aerodynamic passages 204,206 are positioned or orientated in the most aerodynamically beneficial manner so that air flow is maximized and correctly directed during pet 112 inhaling and exhaling. However, in some pet toys, the outer shell may be flat or nearly flat. In this regard, FIG. 8 is a fragmentary cross-sectional view of a flat exterior shell of another breathing support pet toy in accordance with one or more preferred embodiments of the present invention. The passages 204,206 in this shell are otherwise similar to those of the shell 210 of FIG. 7.

Figure 9:
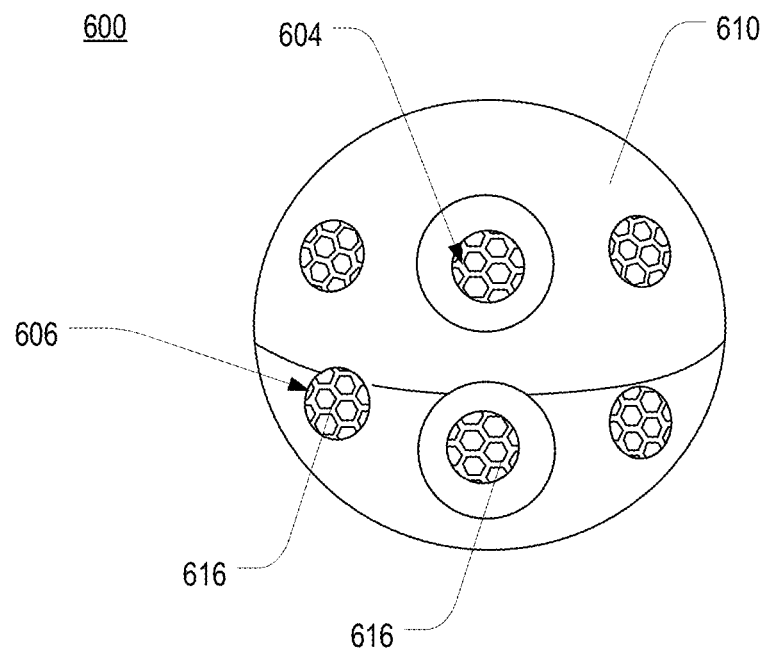
FIG. 9 is a front view of another breathing support pet toy with aerodynamic passages and an inner air filter in accordance with one or more preferred embodiments of the present invention.
Figure 10:
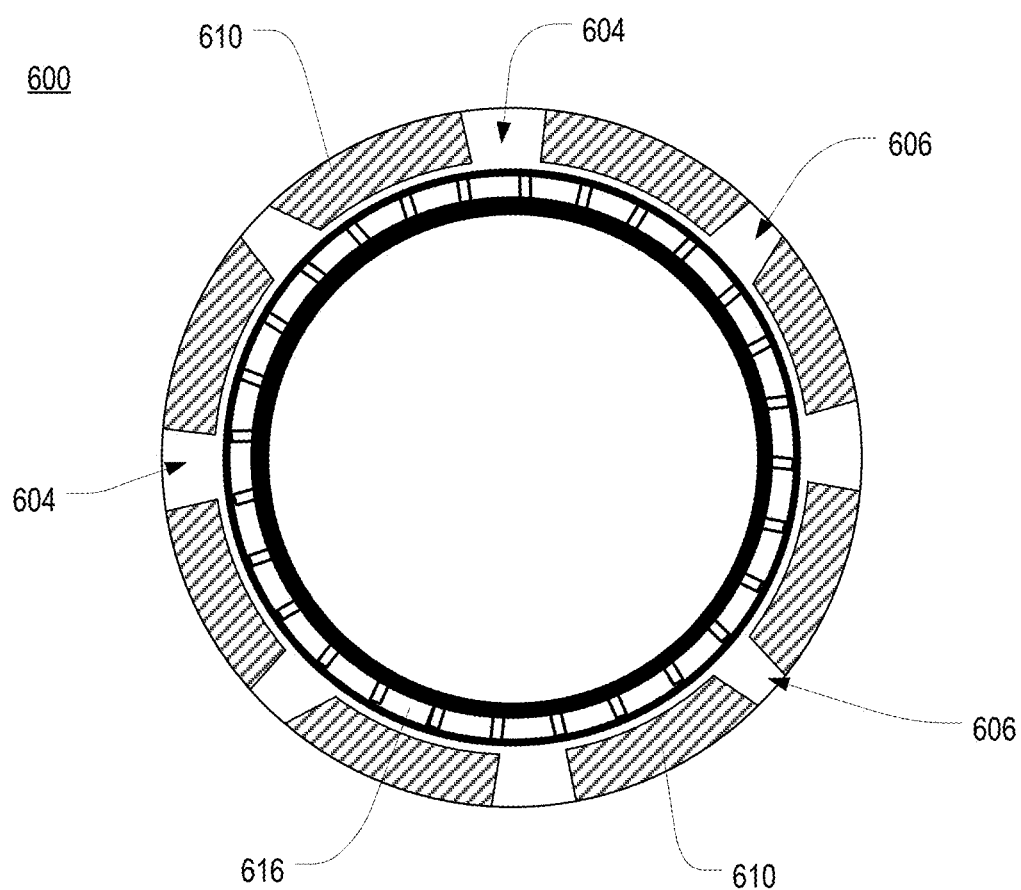
FIG. 10 is a cross-sectional view of the pet toy of FIG. 9.
Figure 11:
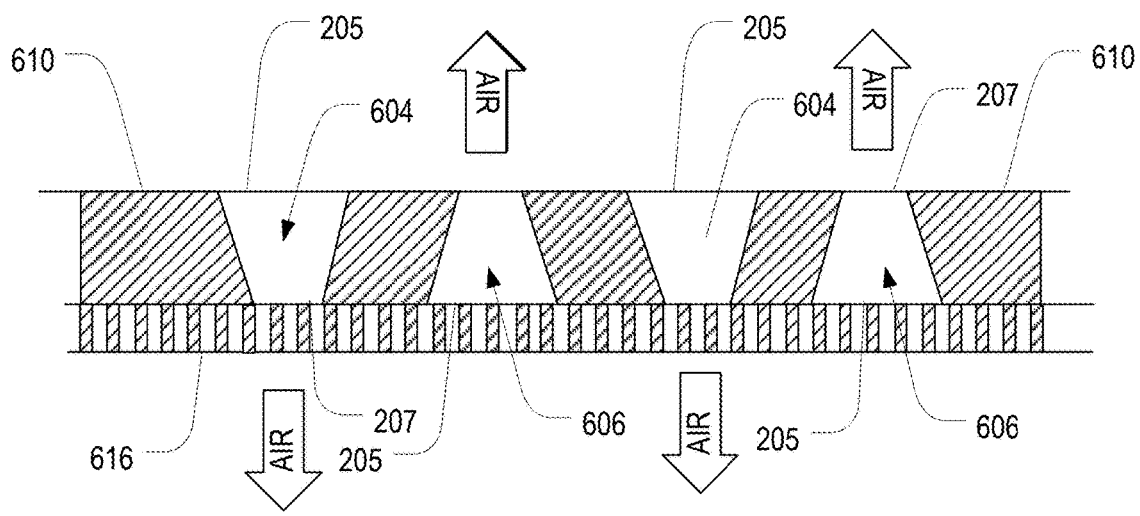
FIG. 11 is a cross-sectional view of a flattened version of the exterior shell of the breathing support pet toy of FIG. 9.

FIG. 9 is a front view of another breathing support pet toy 600 with aerodynamic passages 604,606 and an inner air filter 614 in accordance with one or more preferred embodiments of the present invention, FIG. 10 is a cross-sectional view of the pet toy 600 of FIG. 9, and FIG. 11 is a cross-sectional view of a flattened version of the exterior shell 610 of the breathing support pet toy 600 of FIG. 9. The air filter 616, placed inside the exterior shell 610, blocks dirt, sand or larger particulates or objects that are prone to enter the mouth of a pet 112, while breathing and holding the pet toy 600 in their mouth.

Figure 12:
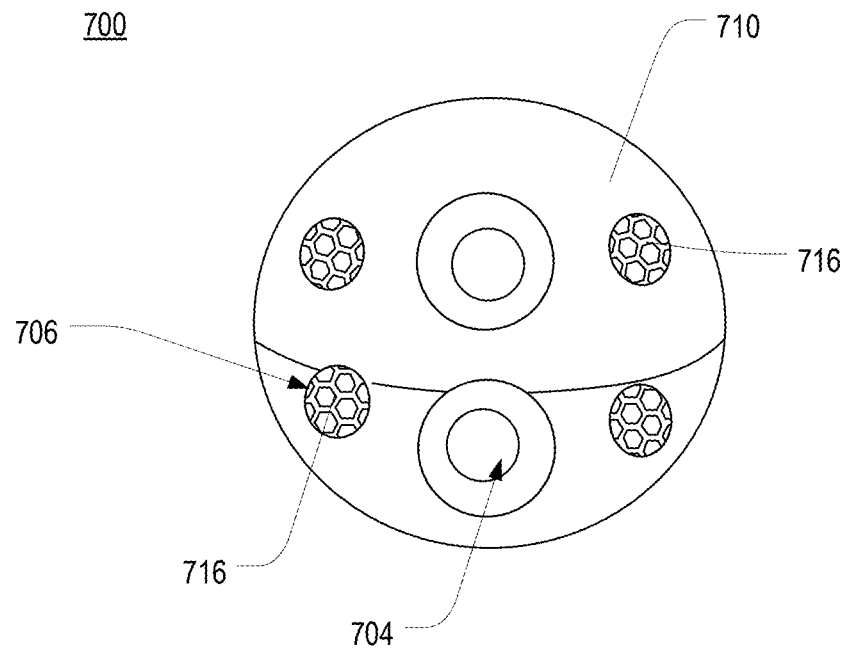
FIG. 12 is a front view of another breathing support pet toy with aerodynamic passages and an inner air filter in accordance with one or more preferred embodiments of the present invention.
Figure 13:
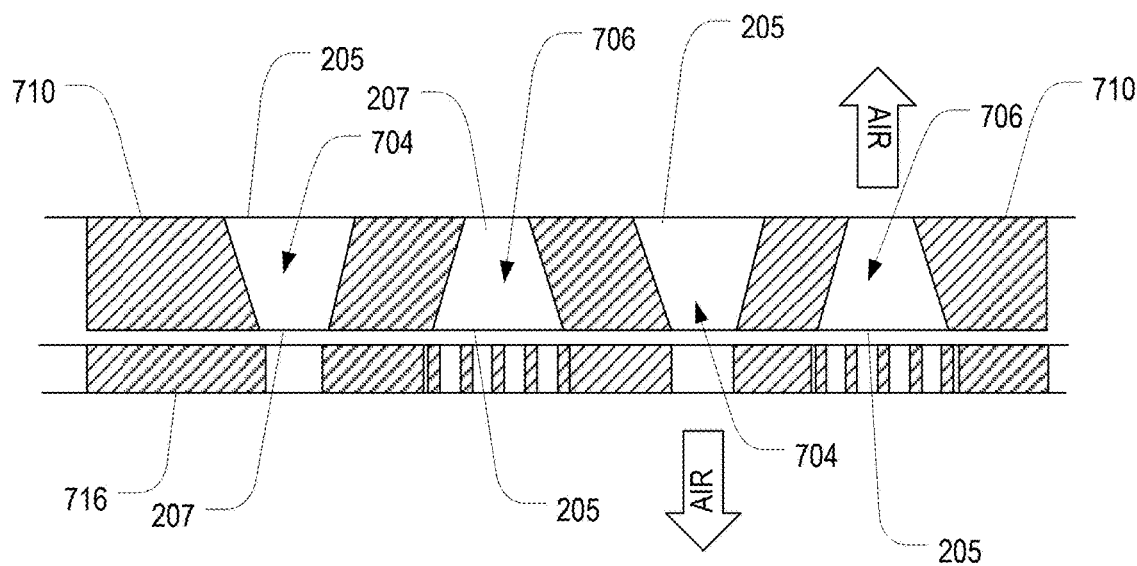
FIG. 13 is a cross-sectional view of a flattened version of the exterior shell of the breathing support pet toy of FIG. 12.
Figure 14:
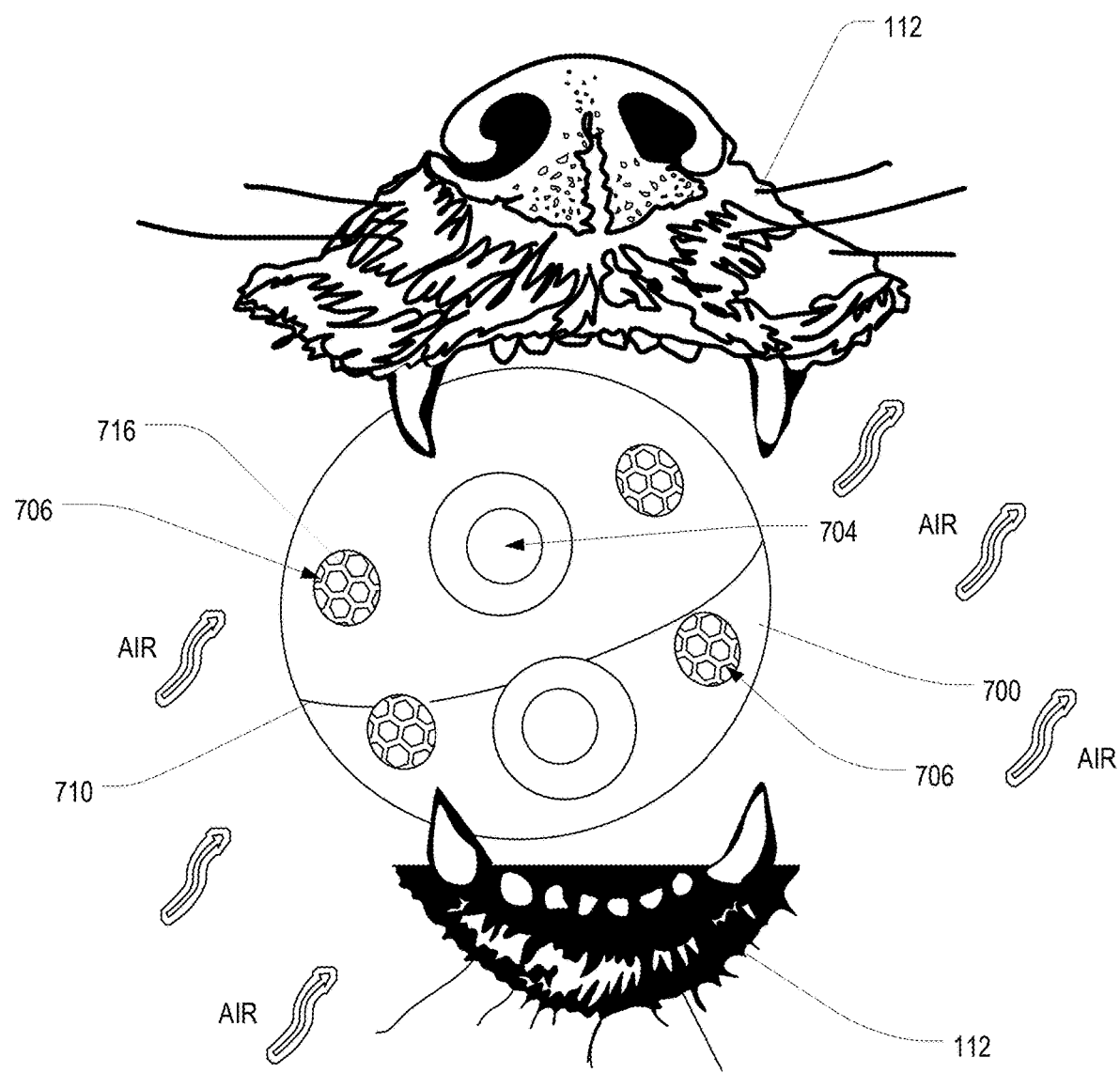
FIG. 14 is an illustration of a dog carrying the ball of FIG. 11 where the air filter has filtration only on the air exhaust passages.

In the pet toy 600 of FIGS. 9 and 10, the inner air filter 616 covers both the air intake passages 604 and the air exhaust passages 606. By contrast, FIG. 12 is a front view of another breathing support pet toy 700 with aerodynamic passages 704,706 and an inner air filter 714 in accordance with one or more preferred embodiments of the present invention, and FIG. 13 is a cross-sectional view of a flattened version of the exterior shell 710 of the breathing support pet toy 700 of FIG. 12. The air filter 716, placed inside the exterior shell 710, blocks dirt, sand or larger particulates or objects that are prone to enter the mouth of a pet 112, while breathing and holding the pet toy 700 in their mouth. The air filter 716 of FIGS. 12 and 13, however, has filtration on only the air exhaust passages 706. FIG. 14 is an illustration of a dog 112 carrying the ball 700 of FIG. 11 where the air filter 716 has filtration only on the air exhaust passages 706.

Figure 15:
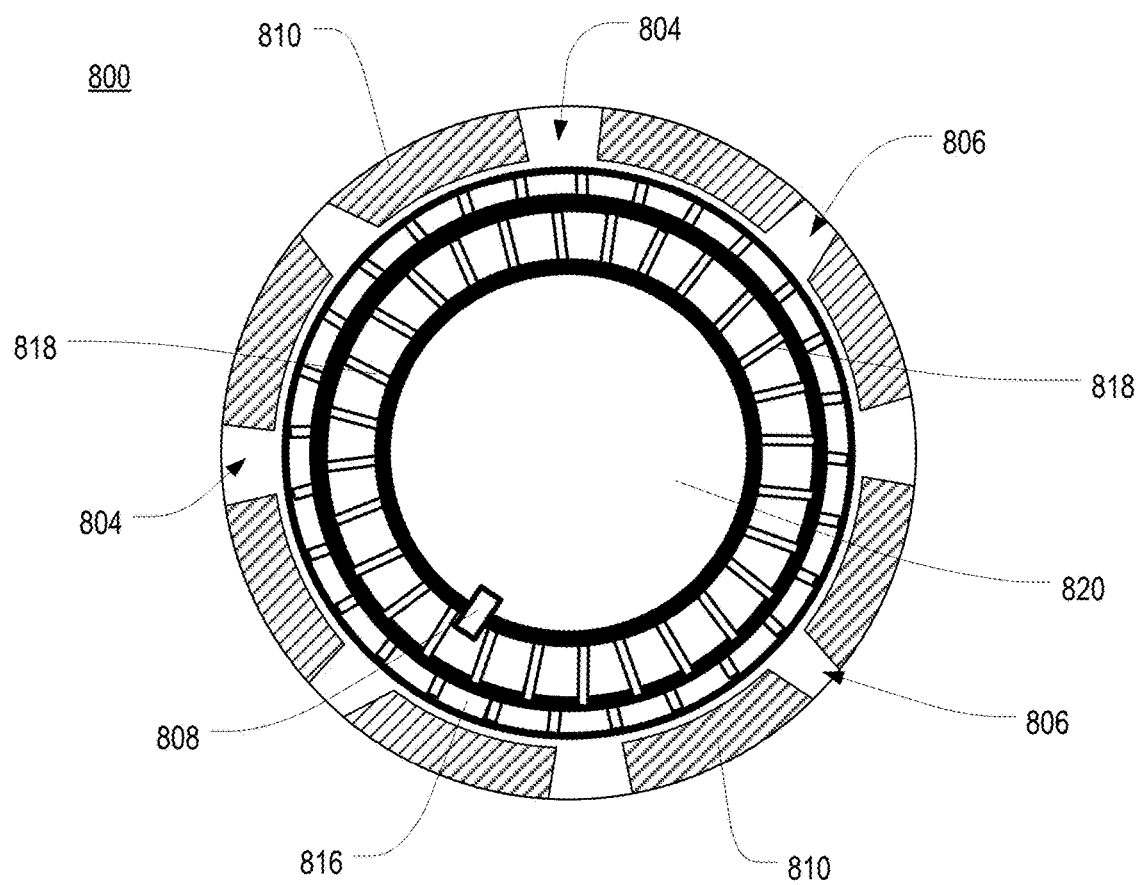
FIG. 15 a cross-sectional view of another breathing support pet toy with aerodynamic passages, an inner air filter, and a sound emission device in accordance with one or more preferred embodiments of the present invention.

The addition of a sound emission device installed in a breathing support toy encourages pets 112 to use and play with the toy. In this regard, FIG. 15 a cross-sectional view of another breathing support pet toy 800 with aerodynamic passages 804,806, an inner air filter 814, and a sound emission device in accordance with one or more preferred embodiments of the present invention. The passages 804, 806 and inner air filter 814 may be generally similar to those of the pet toy 700 of FIGS. 9-11. The sound emission device includes an interior air bellows 820 and an air squeaker 808, operated by the bellows 820, but may alternatively include an electronic sounding device, bell, or other noise maker. Bellow supports 818 may be placed around the air bellow 820, so as to transfer squeezing forces from the exterior shell 810 to the air bellows 820, to enable the sound emission device 808 to produce a sound. Depending on design and construction, bellow supports may or may not be needed to operate an air bellows. In some preferred embodiments, an air bellows may directly abut an air filter.

Figure 16:
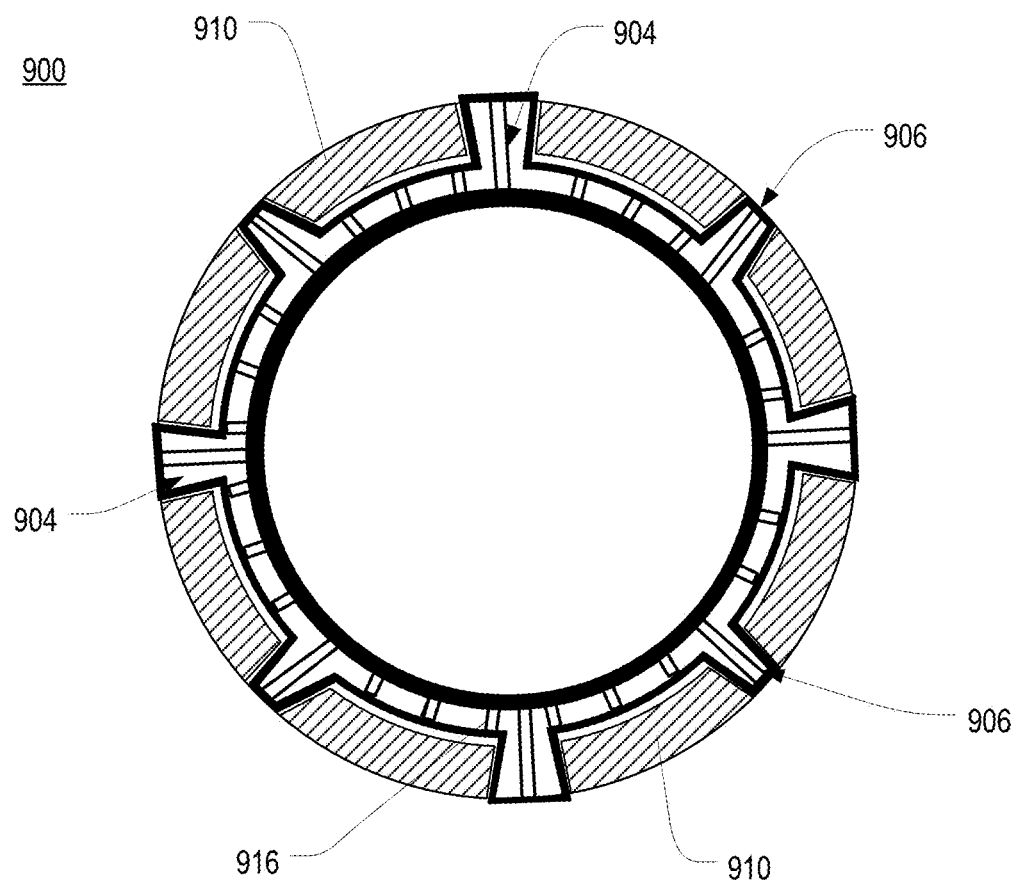
FIG. 16 is a cross-sectional view of another breathing support pet toy with an inner air filter which protrudes into aerodynamic passages in accordance with one more preferred embodiments of the present invention.

FIG. 16 is a cross-sectional view of another breathing support pet toy 900 with an inner air filter 916 which protrudes into aerodynamic passages 904,906 in accordance with one more preferred embodiments of the present invention. The air filter 916 reduces the diameter of the passages 904,906 so objects larger than the filtration of the air filter 916 do not enter the interior of the present invention. The air filter 916 may have a minimum of one hollow air channel that passes through air filter 916.

Figure 17:
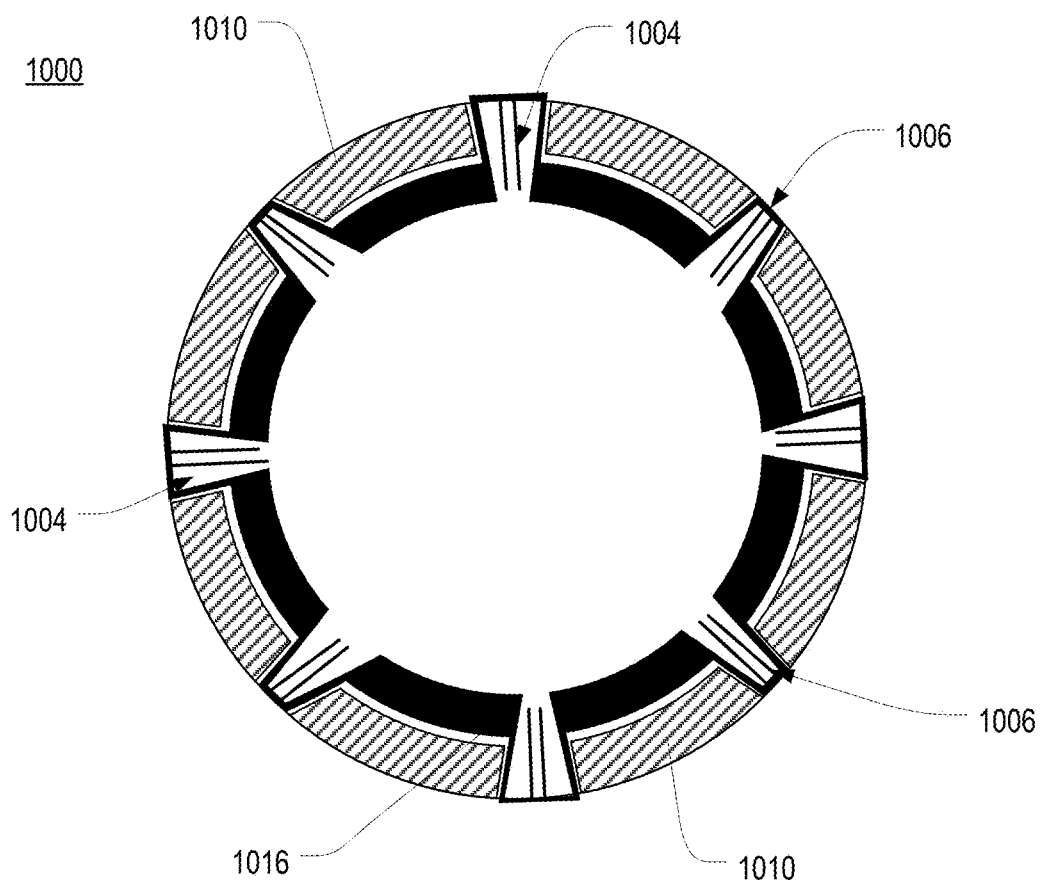
FIG. 17 is a cross-sectional view of another breathing support pet toy with an inner air filter which protrudes into aerodynamic passages in accordance with one more preferred embodiments of the present invention.

In various embodiments, substantially all of an inner air filter may be in contact with the exterior shell, portions but not all of an inner air filter may be in contact with the exterior shell, or a gap may be provided between the interior shell and the outer shell. FIG. 17 is a cross-sectional view of another breathing support pet toy 1000 with an inner air filter 1016 which protrudes into aerodynamic passages 1004,1006 in accordance with one more preferred embodiments of the present invention. As with the pet toy 900 of FIG. 16, the pet toy 1000 of FIG. 17 includes an inner filter 1016 that protrudes into aerodynamic passages 1004,1006, but the arrangement of the filter 1016 is different.

Figure 18:
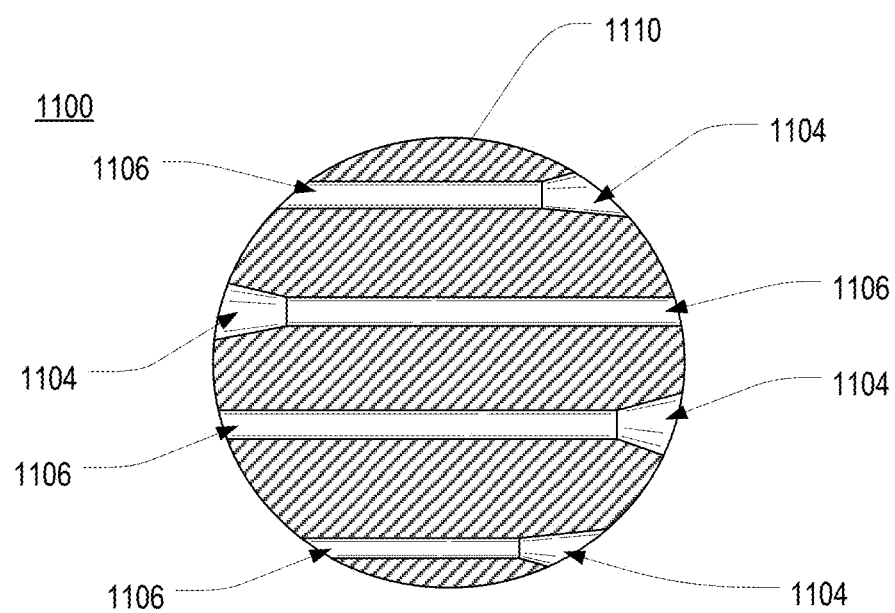
FIG. 18 is a cross-sectional view of another breathing support pet toy with aerodynamic passages in accordance with one or more preferred embodiments of the present invention.

FIG. 18 is a cross-sectional view of another breathing support pet toy 1100 with aerodynamic passages in accordance with one or more preferred embodiments of the present invention. The pet toy includes a solid body 1110 having an exterior and a plurality of air passages 1104,1106 therethrough. Each air passage has a wide entrance 1104 at the exterior of the solid body 1110, a tapered section, and a narrower exit 1106 at the exterior of the solid body 1110. As the ball is carried in the mouth of a pet 112, the wide entrances 1104 of a first set of the air passages facilitate air being drawn therethrough, through the first air passages, and then out of the first air passages via their respective exits 1106 and into the mouth of the pet 112 during an intake of breath, and the wide entrances 1104 of a second set of the air passages, the second set being separate from the first set, facilitate air being expelled from the mouth of the pet 112 through the second set wide entrances 1104, through the second air passages, and then out of the second air passages via their respective exits 1106 during the expelling of breath.

Figure 19:
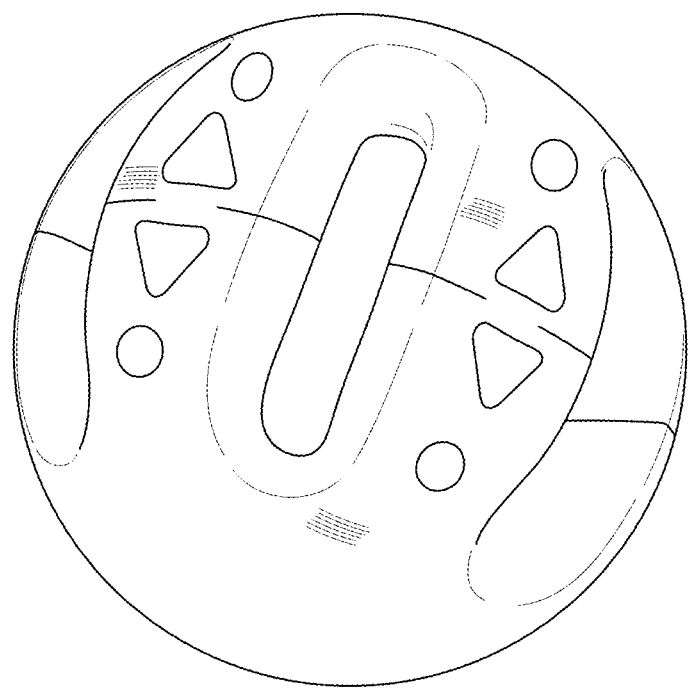
FIG. 19 is a front view of another breathing support pet toy with aerodynamic passages in accordance with one or more preferred embodiments of the present invention.
Figure 20:
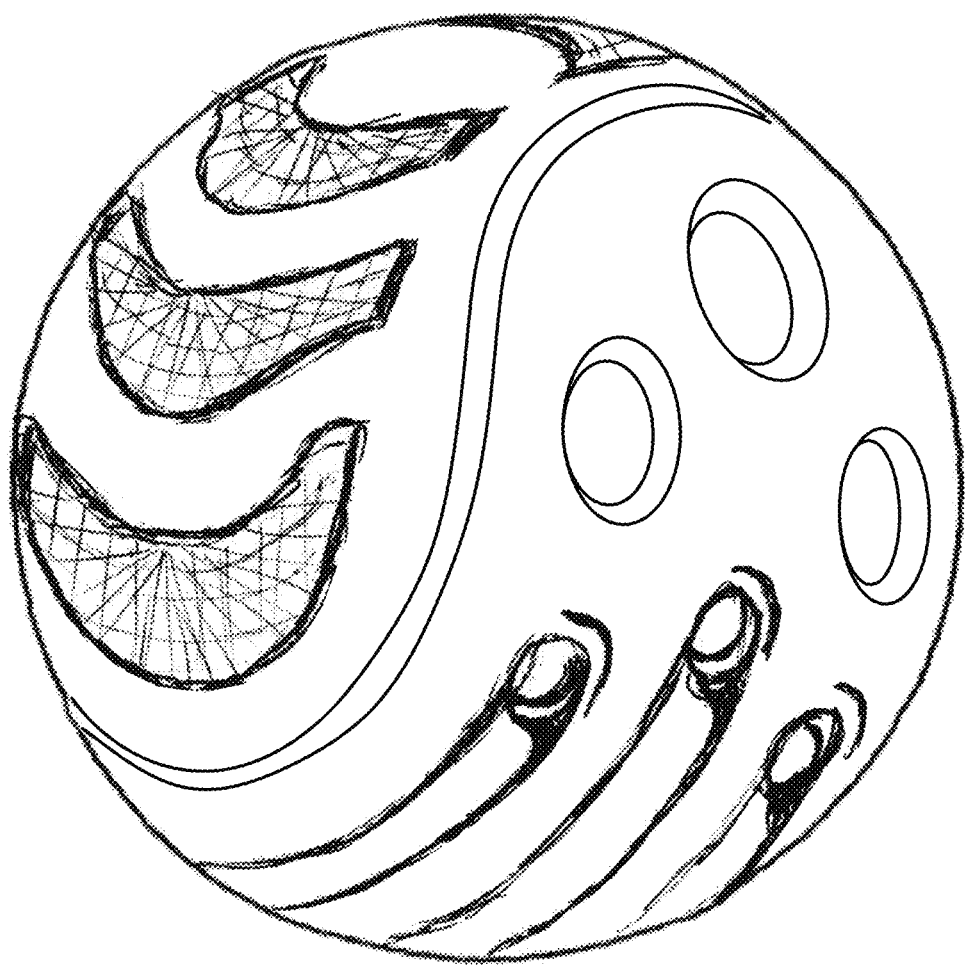
FIG. 20 is a front view of another breathing support pet toy with aerodynamic passages in accordance with one or more preferred embodiments of the present invention.
Figure 21:
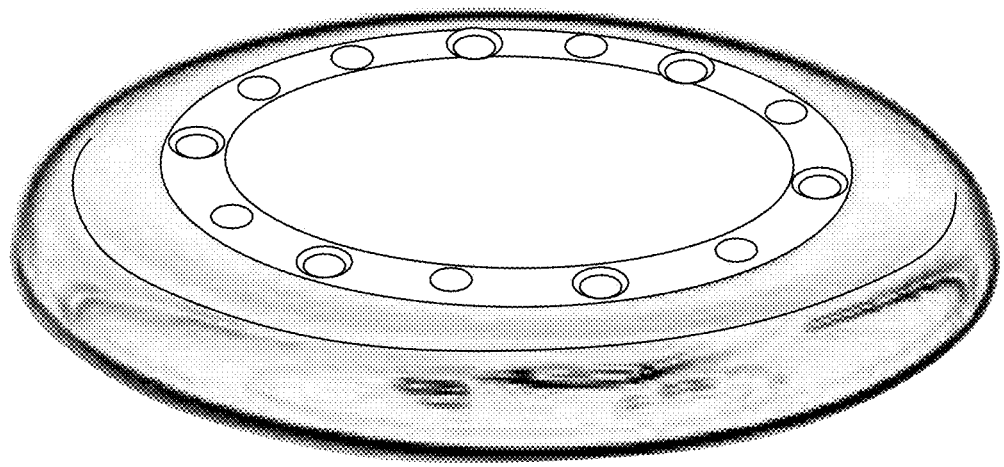
FIG. 21 is a front view of another breathing support pet toy with aerodynamic passages in accordance with one or more preferred embodiments of the present invention, wherein the toy is in the form of a flying disc.

In various embodiments of a pet toy, multiple aerodynamic passages comprised of air intake passages and air exhaust passages are placed and installed on the pet toy exterior shell or outer surface of the breathing support pet toy. The breathing support toy may be of a design including varying sizes of proprietary designed round balls, flying discs, and prolate spheroids with perforated cutouts of various design and shape which allow pet 112 to breathe easier and facilitates breathing and airflow in or out of a pet's mouth while exercising, playing, running, or fetching. In this regard, FIG. 19 is a front view of another breathing support pet toy 1200 with aerodynamic passages in accordance with one or more preferred embodiments of the present invention, and FIG. 20 is a front view of another breathing support pet toy 1300 with aerodynamic passages in accordance with one or more preferred embodiments of the present invention. In the pet toys 1200,1300 of both FIGS. 19 and 20, a variety of intake passages and exhaust passages of different shapes and sizes are provided. Also. FIG. 21 is a front view of another breathing support pet toy 600 with aerodynamic passages in accordance with one or more preferred embodiments of the present invention, wherein the toy is in the form of a flying disc.

The present invention of a breathing support pet toy can be made of any rigid or flexible material such as nylon, plastic, TPR, TPE, rubber and the like. Processes of manufacture can include casting, moulding, blow moulding, injection moulding, machining, joining, additive manufacturing, 3D printing, and the like. The breathing support pet toy can be made as a single part or multiple parts for later assembly. The material type, method of manufacture and assembly to a final consumer product for commercialization can be of any method or type that is known by an Ordinary Artisan or in the industry or art, that may be used for the purposes and system as described herein.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications, or equivalent arrangements; the present invention being limited only by the claims appended hereto and the equivalents thereof.

What is claimed is:

1. A semi-hollow ball for pet play, comprising:
    (a) an outer shell of uniform thickness having an exterior side and an interior side and a plurality of passages therethrough, the plurality of passages including:
        (i) a plurality of intake passages, each intake passage extending a distance through the outer shell and having a wide entrance on the exterior side of the shell tapering to a substantially narrower exit on the interior side of the shell, and
        (ii) a plurality of exhaust passages, each exhaust passage extending a distance through the outer shell and having a wide entrance on the interior side of the shell tapering to a substantially narrower exit on the exterior side of the shell; and
    (b) a hollow interior that is in fluid communication with both (i) the exits of the intake passages and (ii) the entrances to the exhaust passages;
    (c) wherein at least some of the exits of the exhaust passages, on the exterior side of the shell, are substantially narrower than at least some of the entrances to the intake passages, also on the exterior side of the shell;
    (d) wherein the intake passages and the exhaust passages are interspersed with each other around the exterior side of the outer shell;
    (e) wherein the wide entrances of the intake passages facilitate:
        (i) air being drawn into the hollow interior of the ball during an intake of breath when the ball is carried in the mouth of a pet, and
        (ii) air being forced into the hollow interior of the ball during the expelling of breath when the ball is carried in the mouth of the pet;
    (f) wherein the wide entrances of the exhaust passages facilitate:

(i) air being expelled from the hollow interior of the ball during the expelling of breath when the ball is carried in the mouth of the pet, and (ii) air being drawn out of the hollow interior of the ball and into the pet's mouth during an intake of breath when the ball is carried in the mouth of the pet; and (g) wherein, because the intake passages and exhaust passages are interspersed with each other around the exterior side of the outer shell, one or more intake passages and one or more exhaust passages are available for the pet to use during both intake and expelling of breath when the ball is carried in the mouth of the pet.

2. The semi-hollow ball of claim 1, wherein the intake passages are distributed throughout the outer shell of the ball.

3. The semi-hollow ball of claim 2, each intake passage tapering continuously from the entrance thereof to the exit thereof, and wherein each exhaust passage tapers continuously from the entrance thereof to the exit thereof.

4. The semi-hollow ball of claim 3, wherein the entrance and exit of each intake passage have the same shape, but wherein the shape of the entrance is proportionally larger than the shape of the exit.

5. The semi-hollow ball of claim 3, wherein every entrance of every intake passage has the same shape.

6. The semi-hollow ball of claim 3, further comprising one or more filters arranged in the hollow interior of the ball and covering the exits of the intake passages, the entrances to the exhaust passages, or both.

7. The semi-hollow ball of claim 6, wherein the one or more filters cover all of the exits of the intake passages and all of the entrances to the exhaust passages.

8. A perforated ball for pet play, comprising:

(a) a solid body having an exterior and a plurality of distinct, separate air passages therethrough, each air passage having one and only one entrance and one and only one exit and a tapered section therebetween, each entrance being a wide entrance at the exterior of the solid body, and each exit being a narrower exit at the exterior of the solid body, wherein no air passage is in fluid communication with any other air passage;

(b) wherein, as the ball is carried in the mouth of a pet:
(i) the wide entrances of a first set of the air passages facilitate air being drawn through the first set wide entrances, through the first air passages, and then out of the first air passages via their respective exits and into the mouth of the pet during an intake of breath, and
(ii) the wide entrances of a second set of the air passages, the second set being separate from the first set, facilitate air being expelled from the mouth of the pet through the second set wide entrances, through the second air passages, and then out of the second air passages via their respective exits during the expelling of breath.

9. A semi-hollow ball for pet play, comprising:

(a) an outer shell of uniform thickness having an exterior side and an interior side and a plurality of passages therethrough, wherein each passage of the plurality of passages has a uniform length defined by the uniform thickness of the outer shell;

(b) a hollow interior defined by the interior side of the outer shell;

(c) wherein the plurality of passages include:
(i) a plurality of intake passages, each intake passage extending a distance, equal to the uniform length, through the outer shell and having a wide entrance on the exterior side of the shell tapering to a substantially narrower exit on the interior side of the shell such that the intake passage is in fluid communication with the hollow interior, and
(ii) a plurality of exhaust passages, each exhaust passage extending a distance, equal to the uniform length, through the outer shell and having a wide entrance on the interior side of the shell tapering to a substantially narrower exit on the exterior side of the shell such that the exhaust passage is in fluid communication with the hollow interior;

(d) wherein the intake passages and the exhaust passages are interspersed with each other around the exterior side of the outer shell;

(e) wherein the wide entrances of the intake passages facilitate:
(i) air being drawn into the hollow interior of the ball during an intake of breath when the ball is carried in the mouth of a pet, and
(ii) air being forced into the hollow interior of the ball during the expelling of breath when the ball is carried in the mouth of the pet;

(f) wherein the wide entrances of the exhaust passages facilitate:
(i) air being expelled from the hollow interior of the ball during the expelling of breath when the ball is carried in the mouth of the pet, and
(ii) air being drawn out of the hollow interior of the ball and into the pet's mouth during an intake of breath when the ball is carried in the mouth of the pet; and (g) wherein, because the intake passages and exhaust passages are interspersed with each other around the exterior side of the outer shell, one or more intake passages and one or more exhaust passages are available for the pet to use during both intake and expelling of breath when the ball is carried in the mouth of the pet.

10. The semi-hollow ball of claim 9, further comprising an interior shell that is disposed within the hollow interior defined by the interior side of the outer shell, wherein the outer shell is a first shell and the interior shell is a second shell, wherein the first and second shells are distinct from one another, and wherein the entirety of each passage from entrance to exit is defined by the first shell.

11. The semi-hollow ball of claim 10, wherein a gap is provided between the interior shell and the outer shell.

12. The semi-hollow ball of claim 10, wherein a sound emission device is disposed within the interior shell of the ball.

13. The semi-hollow ball of claim 12, wherein the sound emission device includes a bellows and a squeaker.

14. The semi-hollow ball of claim 13, wherein the bellows is connected to the interior shell by supports.

* * * * *